United States Patent [19]

Shimizu et al.

[11] Patent Number: 5,013,585
[45] Date of Patent: May 7, 1991

[54] METHOD FOR THE PREPARATION OF SURFACE-MODIFIED SILICA PARTICLES

[75] Inventors: Takaaki Shimizu; Tsutomu Ogihara; Masatoshi Takita, all of Niigata, Japan

[73] Assignee: Shin-Etsu Chemical Co., Ltd., Tokyo, Japan

[21] Appl. No.: 534,450

[22] Filed: Jun. 6, 1990

[30] Foreign Application Priority Data

Jun. 13, 1989 [JP] Japan .................. 1-149860

[51] Int. Cl.⁵ .............................. B05D 7/00
[52] U.S. Cl. .................. 427/220; 427/215; 428/405
[58] Field of Search ............... 427/215, 220; 428/405

[56] References Cited

U.S. PATENT DOCUMENTS

| | | | |
|---|---|---|---|
| 2,829,981 | 4/1958 | Shapiro | 427/215 |
| 2,993,809 | 7/1961 | Bueche et al. | 427/220 |
| 4,013,574 | 3/1977 | Leikhim et al. | 427/220 X |
| 4,015,031 | 3/1977 | Reinhardt et al. | 427/220 X |
| 4,030,940 | 6/1977 | Chviro et al. | 427/220 X |
| 4,151,154 | 4/1979 | Berger | 428/405 |
| 4,724,167 | 2/1988 | Evans et al. | 428/405 X |
| 4,756,971 | 7/1988 | Virtanen et al. | 428/405 |
| 4,844,980 | 7/1989 | Grüning et al. | 428/446 X |
| 4,847,159 | 7/1989 | Glajch et al. | 428/405 X |
| 4,895,914 | 1/1990 | Saitoh et al. | 428/405 X |

Primary Examiner—Shrive Beck
Assistant Examiner—Alain Bashore
Attorney, Agent, or Firm—McAulay Fisher Nissen Goldberg & Kiel

[57] ABSTRACT

A method for the preparation of a stable silica organosol in a hydrophobic organic solvent is proposed. The method comprises (a) hydrolyzing a tetraalkoxy silane, e.g. tetraethoxy silane, in an alcoholic medium in the presence of a limited amount of water and ammonia as a catalyst under controlled conditions so as to produce a silica alcosol in which the silica particles satisfy the requirements that the alkoxy groups and silanolic hydroxy groups are bonded to the silicon atoms on the surface in densities of at least 3.5 $\mu$ moles/m² and not exceeding 2 $\mu$ mmoles/m², respectively, and the specific surface area S given in m²/g and the average particle diameter D given in nm of the silica particles satisfy the relationship of $S \times D \geqq 5000$, D being 1 nm or larger, and (b) admixing the alcosol of silica particles with an organosilicon compound selected from the group consisting of the compounds represented by the general formula $R_{4-n}SiX_n$, $(R_3Si)_2NH$, or $YO\text{---}(\text{---}SiR_2\text{---}O\text{---})_m\text{---}Y$, in which each R is, independently from the others, a hydrogen atom or a monovalent hydrocarbon group, X is a hydroxy group or an alkoxy group, Y is a hydrogen atom or an alkyl group, n is 1, 2 or 3 and m is a positive integer not exceeding 20, in an amount, for example, in the range from 0.01 to 10 moles per mole of the silica particles under agitation of the mixture to effect a reaction for the modification of the surface of the silica particles followed by replacement of the alcoholic medium with a desired organic solvent.

8 Claims, 4 Drawing Sheets

METHOD FOR THE PREPARATION OF SURFACE-MODIFIED SILICA PARTICLES

BACKGROUND OF THE INVENTION

The present invention relates to a method for the preparation of surface-modified finely divided silica particles capable of forming a stable organosol in any organic solvent and useful as a hard-coating agent on plastic lenses, fabric finishing agent, thickening agent of oils and the like.

There are hitherto known silica powder products dispersible in an organic solvent to form a stable organosol of which the silica particles have alkoxy groups bonded to the silicon atoms on the surface. Such silica particles can be prepared by hydrolyzing an alkoxy silane compound in the presence of an alkaline compound as a catalyst.

The thus produced silica particles having an alkoxylated surface are usually hydrophilic so that they are not always dispersible in a highly hydrophobic organic solvent to cause agglomeration of the silica particles or gelation. Accordingly, the organic solvents utilizable as a dispersion medium of silica organosol are limited to those without high hydrophobicity such as alcohols, e.g., methyl alcohol, isopropyl alcohol, n-butyl alcohol and the like.

Several proposals and attempts have been made in the prior art to prepare an organosol of silica or other inorganic oxides of which the organic solvent as the dispersion medium has a relatively high hydrophobicity. For example, Japanese Patent Kokai No. 63-182204 teaches a method comprising the steps of: (1) hydrolyzing a hydrolyzable compound, such as alkoxides and derivatives thereof, of an inorganic or metallic element, e.g., silicon, titanium, zirconium, aluminum and the like, in a hydrous alcoholic solvent to prepare a suspension of finely divided hydrated oxide particles in the alcoholic solvent; (2) modifying the surface of the particles by admixing the suspension with a coupling agent such as silane compounds, titanate compounds, aluminum compounds and the like having, in a molecule, at least one non-hydrolyzable organic group and at least one hydrolyzable organic group; and (3) replacing the alcoholic solvent with a desired organic solvent having higher hydrophobicity than the alcoholic solvent.

When a tetraalkoxy silane, for example, is used as the coupling agent in the above mentioned surface-modification method of silica particles, a large number of silanol groups are formed on the surface of the silica particles due to the molar ratio of water as the hydrolyzing agent to the tetraalkoxy silane which is usually larger than 6 so that the effect of surface modification cannot be obtained as desired. In addition, this method is applicable only when the finely divided silica particles have an average particle diameter of 0.05 to 5 μm and practically no surface modification cannot be obtained on finer silica particles. In other words, the particle diameter of the silica particles in a silica organosol obtained by this method is relatively large so that such a silica organosol is not always satisfactory when it is used in practical applications as a hard-coating agent on plastic lenses or a thickening agent of oils in respect of the low mechanical strength and transparency or insufficient thickening effect.

SUMMARY OF THE INVENTION

The present invention accordingly has an object to provide a novel method for the preparation of finely divided silica particles capable of being dispersed with stability in any organic solvent to form a silica organosol by the method of surface modification of silica particles having a porous surface and alkoxy groups in a high density on the surface as prepared by the hydrolysis of a tetraalkoxy silane in an alcoholic medium containing water and an alkaline compound as a catalyst under limited conditions.

Thus, the method of the present invention for the preparation of surface-modified silica particles comprises the steps of:

(a) hydrolyzing a tetraalkoxy silane compound in a medium of an alcohol containing from 2.5 to 6.0 moles of water and from 0.1 to 3 moles of an alkaline compound as a catalyst, each per mole of the tetraalkoxy silane compound, to form an alcosol of silica particles having alkoxy groups and hydroxy groups bonded to the silicon atoms on the surface; and (b) admixing the alcosol of silica particles with an organosilicon compound selected from the group consisting of the compounds represented by the general formula

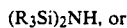

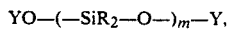

in which each R is, independently from the others, a hydrogen atom or an unsubstituted or substituted monovalent hydrocarbon group having 1 to 20 carbon atoms, X is a hydroxy group or an alkoxy group having 1 to 4 carbon atoms, Y is a hydrogen atom or an alkyl group having 1 to 4 carbon atoms, the subscript n is 1, 2 or 3 and the subscript m is a positive integer not exceeding 20, in an amount, for example, in the range from 0.01 to 10 moles per mole of $SiO_2$ in the silica particles under agitation of the mixture to effect a reaction for the modification of the surface of the silica particles.

In particular, the conditions of the hydrolysis reaction in the above mentioned step (a) should be controlled such that the silica particles in the alcosol have alkoxy groups and silanolic hydroxy groups bonded to the silicon atoms on the surface in densities of at least $3.5\mu$ moles/m$^2$ and not exceeding $2\mu$ moles/m$^2$, respectively, and the specific surface area S given in m$^2$/g and the average particle diameter D given in nm of the silica particles satisfy the relationship of $S \times D \geq 5000$, D being 1 nm or larger.

DETAILED DESCRIPTION OF THE PREFERRED EMBODIMENTS

Figure 1A:
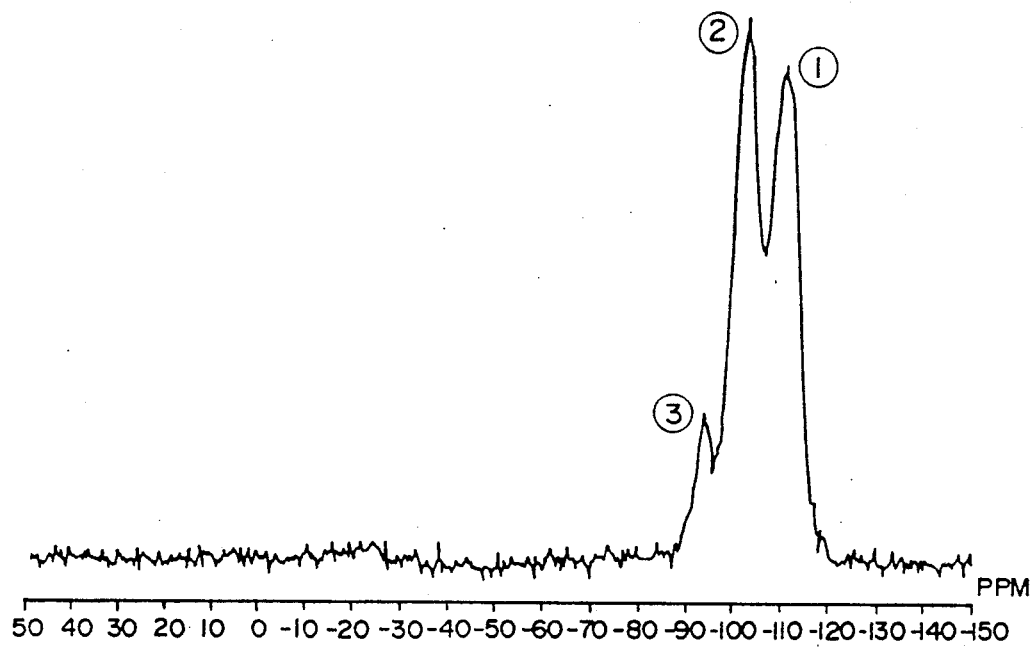
FIGS. 1a and 1b are each a diagram of the $^{29}$Si-NMR and $^{13}$C-NMR spectrum, respectively, of the porous silica particles used as the starting material in Example 1.

As is described above, the scope of the invention consists in the surface-modification reaction of the finely divided silica particles having an alkoxylated surface with a specified organosilicon compound. In particular, the method of the invention is effective when the finely divided silica particles have alkoxy groups and silanolic hydroxy groups bonded to the silicon atoms on the surface in a density of at least $3.5\mu$ moles/m$^2$ and not exceeding $2\mu$ moles/m$^2$, respectively, and the specific surface area S given in m$^2$/g and the average particle diameter D given in nm of the silica particles satisfy the relationship of $S \times D \geq 5000$, D being 1 nm or larger.

According to the teaching by Watson, Analytical Chemistry, volume 20, page 576 (1948) relative to the morphology of particles, a specific surface area S given in m$^2$/g and a particle diameter D given in nm of particles give a value of $S \times D$ of 2720 assuming spherical and monodisperse particles having no porosity. In other words, a valu of $S \times D$ larger than 2720 means that the particles are more or less porous or deviate from the spherical particle configuration. Thus, silica particles may have increased reactivity with the organosilicon compound as the surface-modifying agent as the value of $S \times D$ increases over 2720 with an increased specific surface area.

In contrast to the silica particles in conventional silica alcosols, of which the value of $S \times D$ is usually in the range from 3000 to 4000, the starting silica particles prepared in step (a) of the inventive method are so porous as to have a value of $S \times D$ of at least 5000 so that the silica particles have very high reactivity with the organosilicon compound as the surface-modifying agent used in step (b) to exhibit the desired effect of stabilization in an organosol even in a highly hydrophobic organic solvent.

It is also important that the densities of the alkoxy groups and the silanolic hydroxy groups on the surface of the silica particles subjected to the surface modification are at least $3.5\mu$ moles/m$^2$ and not exceeding $2\mu$ moles/m$^2$, respectively. This requirement means that the surface of the silica particles should be considerably highly hydrophobic due to the high density of the alkoxy groups. This is also in contrast to the silica particles in the silica organosol disclosed in the above mentioned Japanese Patent Kokai No. 63-182204 as prepared from an alkoxy silane as a consequence of the low density of the alkoxy groups and high density of silanolic hydroxy groups. Namely, the conventional silica particles have a hydrophilic surface as a consequence of the high density of the silanol groups so that a large amount of water is adsorbed on the surface to hinder the access of the molecules of the intrinsically hydrophobic organosilicon compound and disturb and retard the reaction for the surface modification. Since the silica particles used in step (b) of the inventive method have a hydrophobic surface adsorbing only a small number of water molecules and, instead, adsorbing a large number of alcohol molecules, the molecules of the organosilicon compound have easy accessibility to the silica surface so that the reaction of surface modification can proceed smoothly and rapidly. This is the reason for the preferred surface property of the silica particles prepared in step (a) and used in step (b) of the inventive method.

The above defined strong surface hydrophobicity of silica particles can be obtained, for example, by conducting the hydrolysis of the tetraalkoxy silane in step (a) according to the following procedure. Thus, an alcohol solution of a tetraalkoxy silane is added dropwise gradually to a hydrolysis medium under vigorous agitation which is an alcohol containing from 2.5 to 6 moles of water and 0.1 to 3 moles of an alkaline compound as a catalyst per mole of the tetraalkoxy silane to effect the hydrolysis reaction at a specified temperature. The amount of the tetraalkoxy silane added to the hydrolysis medium should be such that the concentration thereof in the medium after completion of the addition thereto is in the range from 0.1 to 6 moles per liter. It is essential in this process that the agitation of the reaction mixture is as vigorous as possible. Insufficient agitation of the reaction mixture may cause a disadvantage that precipitable silica paerticles are eventually formed. It is preferable that the hydrolysis reaction is performed in a closed vessel since otherwise the alcohol or the alkaline catalyst, when it is a volatilizable compound, may be evaporated so that the concentrations thereof are subject to changes in the lapse of time affecting the reproducibility of the process.

The tetraalkoxy silane above mentioned is a compound represented by the general formula Si(OR$^1$)$_4$, in which R$^1$ is an alkyl group having 1 to 4 carbon atoms. Examples of the tetraalkoxy silane include tetramethoxy silane, tetraethoxy silane, tetra(n-propoxy) silane, tetra(n-butoxy) silane and the like. As a general trend, the use of a tetraalkoxy silane having higher alkyl groups as the starting material results in coarser silica particles. For example. the average particle diameter of the resultant silica particles is in the ranges of 5 to 500 nm, 100 to 2500 nm, 250 to 3000 nm and 500 to 5000 nm when tetramethoxy silane, tetraethoxy silane, tetra(n-propoxy) or tetra(isopropoxy) silane and tetra(n-butoxy) or tetra(isobutoxy) silane, respectively, are used as the tetraalkoxy silane. Accordingly, selection of the starting tetraalkoxy silane is a factor to be considered in order to control the average particle diameter of the silica particles as desired.

The concentration of the tetraalkoxy silane in the alcoholic hydrolysis medium should be in the range from 0.1 to 6 moles/liter or, preferably, from 0.2 to 2 moles/liter. Lower concentrations than the above mentioned lower limit are undesirable because the hydrolysis medium must be voluminous so much that the productivity of the process is low with economical disadvantages. When the concentration of the tetraalkoxy silane is too large, association of the silica particles may eventually take place in the hydrolysis medium to affect the dispersibility of the silica particles and to cause phase separation as a consequence of the agglomeration of the silica particles.

The alcohol used as the hydrolysis medium is a so-called lower alcohol represented by the general formula ROH, in which R has the same meaning as defined above. Examples of preferable alcohols include methyl, ethyl, isopropyl and n-butyl alcohols though not particularly limitative thereto. Selection of the alcohol as the hydrolysis medium also should be considered from the standpoint of controlling the average particle diameter of the silica particles produced therein since use of a higher alcohol may result in a larger diameter of the silica particles as a trend.

The alkaline compound used as a catalyst for the hydrolysis reaction is selected from ammonia and alkyl amines of which the alkyl group is methyl, ethyl, propyl or butyl group including monoalkyl amines, dialkyl amines and trialkyl amines. In particular, ammonia is preferred to alkyl amines because the catalytic activity of alkyl amines is lower than ammonia not to fully accelerate the hydrolysis reaction of the tetraalkoxy silane in addition to the problem that alkyl amines may have an effect as a coagulant of silica particles depending on the concentration thereof in the hydrolysis medium. Ammonia is free from these disadvantages to exhibit high catalytic activity and has an advantage of higher volatilizability than alkyl amines to facilitate subsequent removal from the silica particles as a product.

The amount of the alkaline compound or, in particular, ammonia added to the hydrolysis medium as a catalyst should be in the range from 0.1 to 3 moles or, preferably, from 0.3 to 2 moles per mole of the tetraalkoxy silane or the silicon atoms in the silica product. When the amount of the alkaline compound is too small, the particles of the silica produced thereby would be too fine to be loaded on the surface with electric charges to ensure stability of the silica particle dispersion so that association of the silica particles may eventually take place during or succeeding the hydrolysis reaction to cause gelation. On the other hand, no further enhancement can be obtained in the catalytic effect even by increasing the amount of the alkaline compound to exceed the above mentioned upper limit. At any rate, the concentration of the alkaline catalyst is a factor affecting the average particle diameter of the silica particles so that the concentration should be selected adequately within the above mentioned range in order to obtain an average particle diameter as desired.

The stoichiometric amount of water as the reactant for the hydrolysis is 2 moles per mole of the tetraalkoxy silane. In the preparation of the silica particles in step (a) of the inventive method, the amount of water contained in the hydrolysis medium should not be too large as compared with the stoichiometric amount as in the prior art methods. In particular, the amount of water in the hydrolysis medium should be in the range from 2.5 to 6.0 moles or, preferably, from 3.0 to 5.0 moles per mole of the tetraalkoxy silane. When the amount of water is too small, the hydrolysis reaction cannot proceed to a full extent so that a portion of the tetraalkoxy silane may be left unhydrolyzed or a soluble oligomeric siloxane compound is formed as a partial hydrolysis product of the tetraalkoxy silane. When the amount of water is too large, on the other hand, the hydrolysis reaction proceeds so far as to leave almost no alkoxy groups bonded to the silicon atoms on the silica surface resulting in an increase in the density of the silanolic hydroxy groups not to meet the requirement in the inventive method. It is also a known trend that an increase in the amount of water for hydrolysis results in an increase in the average diameter of the silica particles produced by the hydrolysis of a tetraalkoxy silane.

The mechanism of the process from the hydrolysis reaction of the tetraalkoxy silane compound to the formation of silica particles can be expressed by the following reaction equations:

$$Si(OR^1)_4 + xH_2O \rightarrow Si(OH)_x(OR^1)_{4-x} + xR^1OH; \quad (1)$$

$$\equiv Si-OH + HO-Si \equiv \rightarrow \equiv Si-O-Si \equiv + H_2O; \quad (2)$$

and $$\equiv Si-OH + R^1O-Si \equiv \rightarrow \equiv Si-O-Si \equiv + R^1OH, \quad (3)$$

in which x is a positive integer not exceeding 4. Thus, the molecules of the hydroxy silane formed by the reaction of the equation (1) pertains to a dehydration condensation reaction between the silanol groups according to the equation (2) or dealcoholation condensation reaction between the silanol group and the alkoxy group according to the equation (3) to form a siloxane linkage so that the species in the hydrolysis medium successively grows to follow the successive order of "monomeric hydroxy silane→oligomer→polymer→fine particle" as the condensation reaction proceeds to increase the molecular weight of the species reaching the desired particle size. The hydrolysis reaction is performed at a temperature in the range from 10° to 50° C. or, preferably, from 20° to 40° C. When the temperature is too low, disadvantages are caused that, in addition to an unduly low velocity of the hydrolysis reaction and/or condensation reaction as a matter of course, the velocity of coordination of the alkali or ammonium ions on to the surface of the silica particles is also decreased to disturb ionic stabilization of the silica particles and to promote association of the silica particles. At an excessively high temperature, on the other hand, stabilization of the silica particles takes place when the particles still have an unduly small particle size with a low degree of condensation due to the accelerated coordination of the alkali ions resulting in formation of silica particles having a disadvantageously small particle diameter. At any rate, the temperature of the hydrolysis reaction is a factor influencing the particle diameter of the silica particles so that the temperature should be adequately selected within the above mentioned range depending on the desired average particle diameter of the silica particles.

As is described above, the average particle diameter of the silica particles prepared in step (a) of the inventive method can be controlled by adequately selecting several factors including, for example, the kinds of the tetraalkoxy silane and alcohol as the hydrolysis medium or, in particular, the number of carbon atoms in the alkyl group thereof, concentration of the alkaline catalyst, amount of water added to the hydrolysis medium, reaction temperature and so on, of which the primary selection should be made for the kind of the tetraalkoxy silane.

The scope of step (b) of the inventive method consists in the reaction of the thus produced finely divided porous silica particles in an alcoholic dispersion or alcosol with a specific organosilicon compound added to the dispersion so as to introduce organosilicon groups as the modifying entity of the silica surface. The organosilicon compound added to the alcoholic dispersion of the silica particles is selected from the compounds represented by either one of the general formulas $$R_{4-n}SiX_n, \quad (I)$$

$$(R_3Si)_2NH, \quad (II)$$

and $$YO-(-SiR_2-O-)_m-Y, \quad (III)$$

in which each R is, independently from the others, a hydrogen atom or an unsubstituted or substituted monovalent hydrocarbon group having 1 to 20 carbon atoms, X is a hydroxy group or an alkoxy group having 1 to 4 carbon atoms, Y is a hydrogen atom or an alkyl group having 1 to 4 carbon atoms, the subscript n is 1, 2 or 3 and the subscript m is a positive integer not exceeding 20.

Examples of the compounds represented by the above given general formula (I) include: alkoxy silane compounds such as tri-methyl methoxy silane; triethyl methoxy silane; triphenyl methoxy silane; dimethyl vinyl methoxy silane; 3,3,3-trifluoropropyl dimethyl methoxy silane; 3-aminopropyl dimethyl methoxy silane; dimethyl dimethoxy silane; methyl vinyl dimethoxy silane; diphenyl dimethoxy silane; 3-aminopropyl methyl dimethoxy silane; methyl trimethoxy silane; vinyl trimethoxy silane; phenyl trimethoxy silane; 3-glycidyloxypropyl trimethoxy silane; 3-methacryloxypropyl trimethoxy silane; 3-aminopropyl trimethoxy silane and the like. Examples of the compounds represented by the above given general formula (II) include: hexaorganodisilazane compounds such as hexamethyl disilazane; 1,1,3,3-tetramethyl-1,3-divinyl disilazane and the like. Examples of the compounds represented by the above given general formula (III) include: silanol compounds such as trimethyl silanol, triethyl silanol, triphenyl silanol, diphenyl silane diol, $\alpha,\omega$-dihydroxy dimethyl polysiloxane oligomers, $\alpha,\omega$-dihydroxy methyl phenyl polysiloxane oligomers and the like. These organosilicon compounds can be used either singly or as a combination of two kinds or more according to need.

The amount of the above mentioned organosilicon compound to be reacted with the silica particles as a surface-modifying agent is preferably in the range from 0.01 to 10 moles or, more preferably, from 0.1 to 1 mole per mole of the silicon atoms in the silica particles. When the amount thereof is too small, the desired effect of surface modification of the silica particles is naturally insufficient. When the amount thereof is too large, on the other hand, a considerable amount of the organosilicon compound remains unreacted to cause an economical disadvantage.

The surface-modification reaction of the silica particles with the organosilicon compound is performed by gradually adding a specified amount of the organosilicon compound to an alcosol of the silica particles under agitation and continuing the agitation of the reaction mixture for a length of time of 1 to 8 hours or, preferably, 3 to 5 hours at a temperature of 0° C. or higher or, preferably, 10° C. or higher. When the temperature is too low, the velocity of reaction is narurally low so that an unduly long time is taken for the completion of the reaction.

The silica particles in the form of an alcosol obtained in step (a) of the inventive method contain a large number of alkoxy groups and only a small number of silanolic hydroxy groups so that they can be surface-modified quite satisfactorily by the reaction with the organosilicon compound. When the organosilicon compound added to the silica alcosol has hydrolyzable groups in the molecule, the hydrolyzable groups are hydrolyzed by reacting with water contained in the alcoholic medium of the silica alcosol to be converted into silanolic hydroxy groups. When the $H_2O:Si$ ratio is too large as in the method for the preparation of silica particles disclosed in Japanese Patent Kokai No. 63-182204, the hydrolysis reaction of the organosilicon compound is so rapid that a large number of silanolic hydroxy groups are formed at one time and the silanol condensation reaction proceeds so rapidly to form an oligomeric compound resulting in a decreased efficiency of the surface modification reaction.

On the other hand, the alcoholic medium of the silica alcosol used in the inventive method contains water in a so small amount that the number of the silanolic hydroxy groups formed by the hydrolysis of the organosilicon compound in step (a) is also small and the surface modification reaction of the silica particles can proceed with high efficiency.

The alcoholic medium in which the thus surface-modified silica particles are dispersed can be replaced with any of other non-alcoholic organic solvents without causing phase separation by a known method in which the non-alcoholic organic solvent is added to the dispersion and the silica sol is subjected to distillation to remove the alcoholic solvent. The non-alcoholic organic solvent is not particularly limitative depending on the particular application of the silica organosol as desired. The non-alcoholic organic solvents suitable for this replacement include hydrocarbon solvents such as n-hexane, cyclohexane, toluene, xylene and the like.

In the following, examples and comparative examples are given to more fully illustrate the embodiments of the present invention. Following analytical methods were used for the determination of the silanolic hydroxy groups, alkoxy groups bonded to the silicon atoms and organosilicon surface-modifying groups in the examples and comparative examples.

Determination of Silanolic Hydroxy Groups

The silica particles are heated in an autoclave together with methyl alcohol so as to have the silanolic hydroxy groups converted into silicon-bonded methoxy groups. The silica particles after drying were quantitatively analyzed for the content of carbon before and after this methoxylation and the density of the silanolic hydroxy groups per unit surface area was calculated from the increment in the carbon content using the following equation:

$$\equiv SiOH, \text{moles}/m^2 = \Delta C_0/(12 \times S \times 100).$$

in which $\Delta C_0$ is the increment in the content of carbon given in % by weight and S is the specific surface area of the silica particles given in $m^2/g$ as determined by the BET method using nitrogen gas as the adsorbent.

Determination of Alkoxy Groups and Surface-Modifying Organosilicon Groups Bonded to the Silicon Atoms The silica particles after drying were completely dissolved in a 10% aqueous solution of sodium hydroxide and the alcohol and organosilicon compound isolated by this decomposition from the silica were quantitatively determined by the gas chromatographic analysis to calculate the densities of the alkoxy groups $\equiv SiOR$ and the surface-modifying organosilicon groups $\equiv SiOSiR$ using the following equation:

$$\equiv SiOR \text{ or } \equiv SiOSiR, \text{moles}/m^2 = W/S.$$

in which W is the amount of the alcohol or the organosilicon compound given in moles produced from 1 g of the silica particles and S has the same meaning as given above.

EXAMPLE 1.

A reaction mixture was formed by introducing 182 ml of 28% ammonia water, 110 ml of deionized water and 5542 ml of ethyl alcohol into a glass-made flask of 10 liter capacity equipped with a stirrer, dropping funnel and thermometer. The reaction mixture was kept at a temperature of 38° C. under vigorous agitation and a mixture of 518 ml of tetramethoxy silane and 648 ml of ethyl alcohol was added thereto dropwise over one hour to effect hydrolysis of the tetramethoxy silane. The average particle diameter of the thus obtained silica sol particles dispersed in ethyl alcohol was 40 nm as determined by using a submicron analyzer (Model N4-64SD, manufactured by Coulter Co.). The ethyl alcohol in this silica sol dispersion was evaporated to dryness and the dried silica particles were subjected to the measurement of the specific surface area by the method of nitrogen gas adsorption using an automatic surface area analyzer (Model 2200, manufactured by Shimadzu Seisakusho Co.) to give a value of 250 m$^2$/g. Thus, the value of S(m$^2$/g)×D (nm) was 250×40=10,000.

Figure 1B:
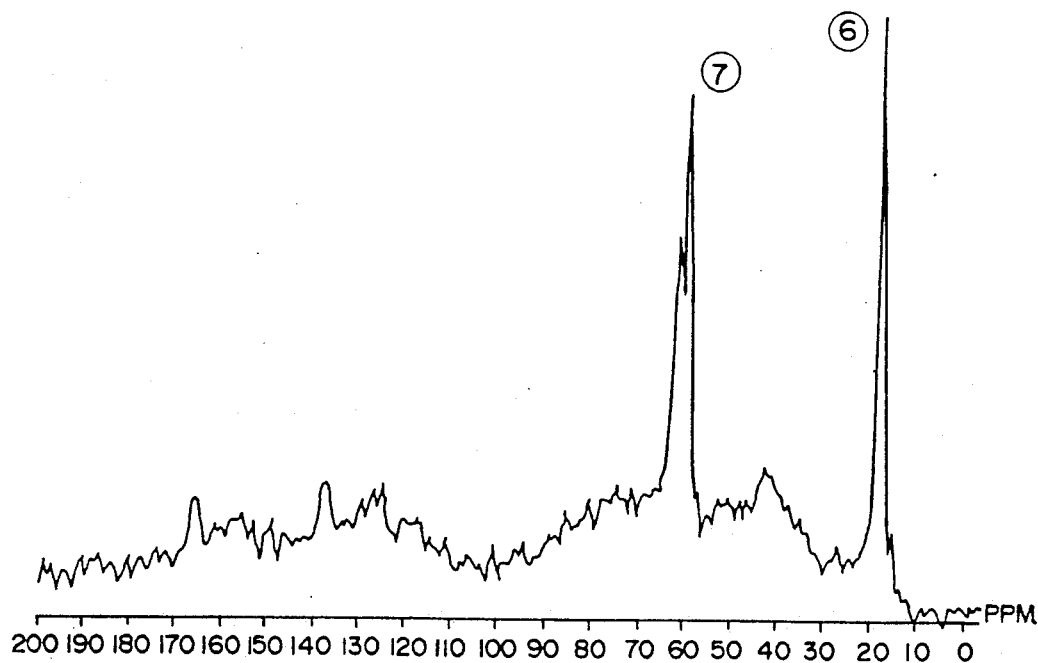

The silica particles were subjected to the measurement of the spectra of $^{29}$Si-NMR and $^{13}$C-NMR by the CP·MAS method using an NMR apparatus (Model GSX-270, manufactured by Nippon Denshi Co.) to give the diagrams shown in FIGS. 1a and 1b, respectively. The densities of ethoxy groups and silanol groups on the surface of the silica particles were 12μ moles/m$^2$ and 1.8μ moles/m$^2$, respectively.

The silica sol in ethyl alcohol as the medium was concentrated by evaporating a part of the ethyl alcohol in a rotary evaporator under reduced pressure so as to have a silica concentration of 20% by weight. A 100 g portion of the thus concentrated silica sol was admixed with 0.5 g of hexamethyl disilazane as a surface-modifying agent and agitated for 3 hours at 20° C. Thereafter, the silica sol was admixed with 120 g of xylene and freed from ethyl alcohol by distillation under reduced pressure to give a silica organosol containing 25% by weight of silica particles, of which the dispersion medium contained at least 99.5% by weight of xylene. The silica organosol was freed from the dispersion medium by evaporation to dryness and the surface-modified silica particles were subjected to the measurement of the spectra of $^{29}$Si-NMR and $^{13}$C-NMR by the CP-MAS method to give the diagrams shown in FIGS. 2a and 2b, respectively.

Table 1 given below summarizes the conditions for the preparation of the silica alcosol from a tetraalkoxy silane as the starting material and the analytical results of the silica particles in the thus obtained silica alcosol. Table 2 below summarizes the conditions for the preparation of the silica organosol in xylene from the silica alcosol.

COMPARATIVE EXAMPLE 1.

Figure 3A:
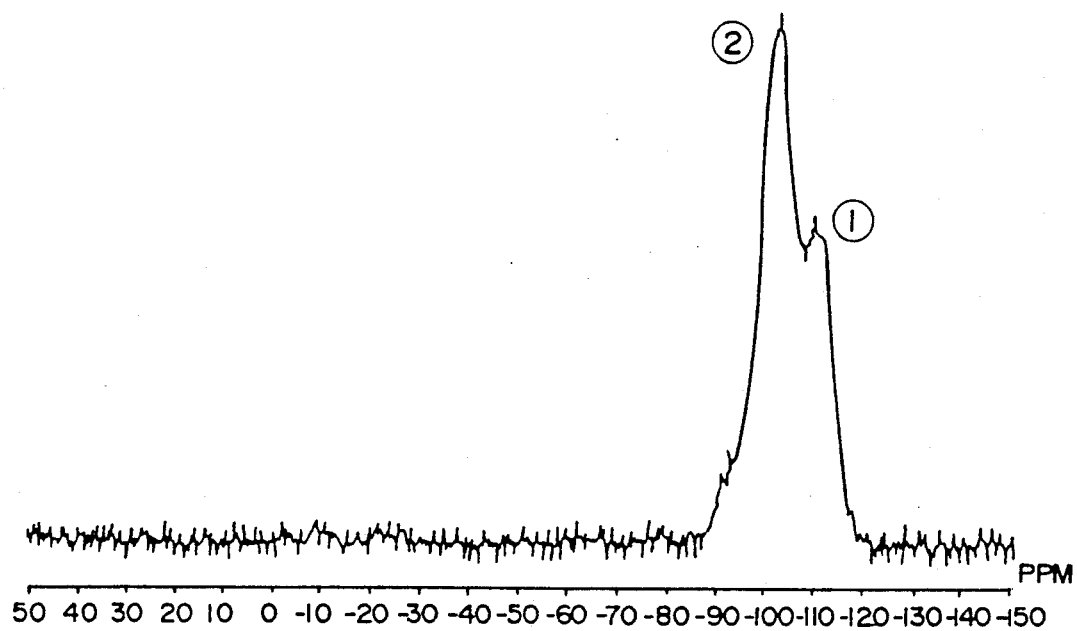
FIGS. 3a and 3b are each a diagram of the $^{29}$Si-NMR and $^{13}$C-NMR spectrum, respectively, of the silica particles prepared and used as the starting material for surface modification in Comparative Example 1.
Figure 3B:
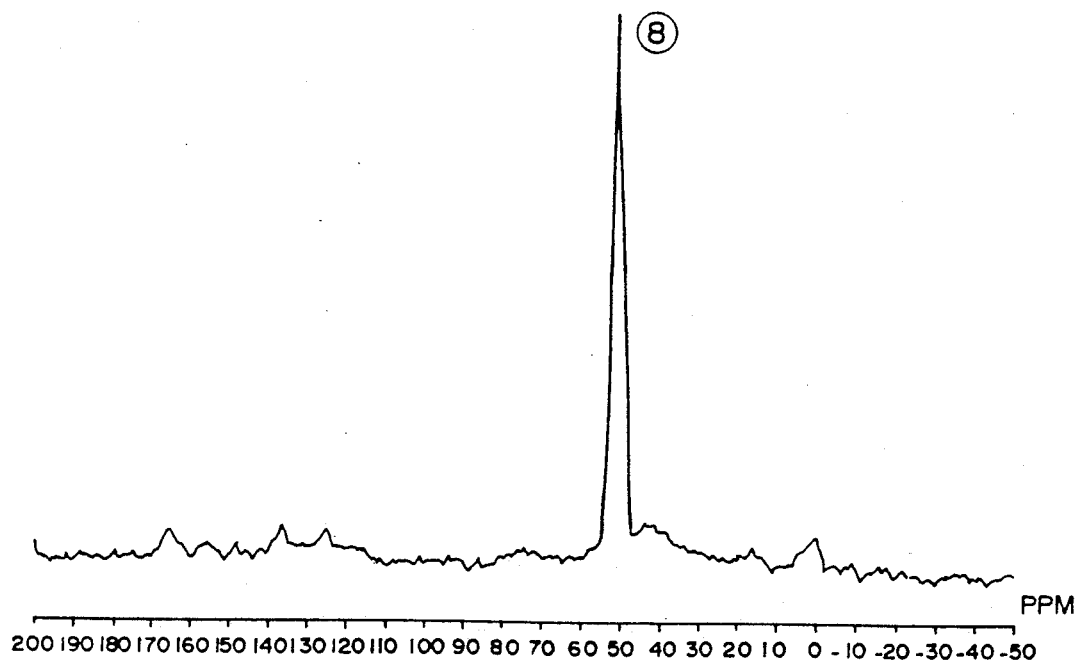

A silica alcosol in methyl alcohol was prepared in a similar manner to Example 1 but under the conditions summarized in Table 1. The thus obtained silica particles had an average particle diameter D of 15 nm and a specific surface area S of 300 m$^2$/g so that the value of S×D was 4500. FIGS. 3a and 3b show the $^{29}$Si-NMR and $^{13}$C-NMR diagrams, respectively, of the thus obtained silica particles.

Figure 4A:
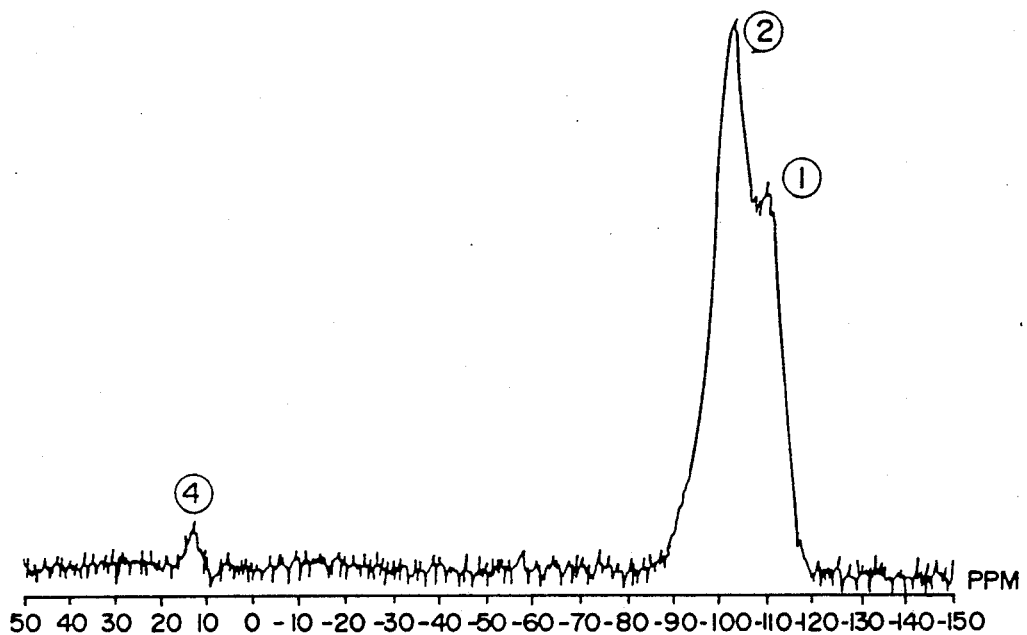
FIGS. 4a and 4b are each a diagram of the $^{29}$Si-NMR and $^{13}$C-NMR spectrum, respectively, of the surface-treated silica particles prepared in Comparative Example 1.
Figure 4B:
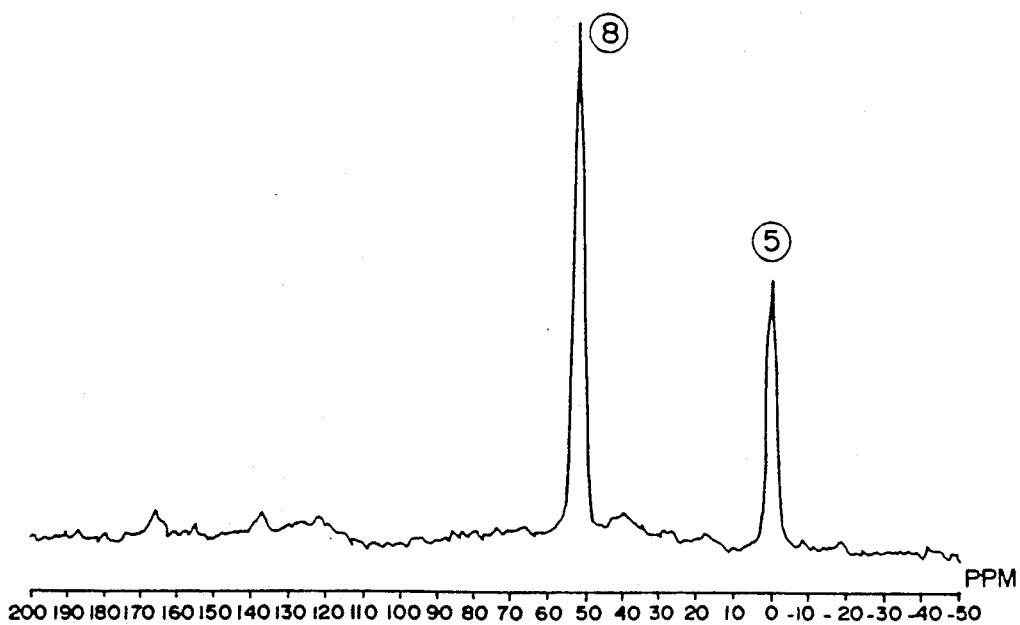

The silica alcosol was then subjected to the surface modification of the silica particles using hexamethyl disilazane as the surface-modifying agent and replacement treatment of the alcoholic dispersion medium with xylene under the conditions summarized in Table 2 to give a silica organosol in xylene. In this case, however, no complete replacement of methyl alcohol with xylene can be achieved since phase separation took place into the silica particles and the organic medium in the course of distillation under reduced pressure when the dispersion medium had reached the composition of 85% by weight of xylene and 15% by weight of methyl alcohol. FIGS. 4a and 4b show the $^{29}$Si-NMR and $^{13}$C-NMR diagrams, respectively, of the silica particles obtained by drying the thus obtained silica organosol.

Comparison of FIGS. 1a and 1b and FIGS. 3a and 3b provides a means for the evaluation of the silica sol particles to meet or not to meet the requirements for the silica sol particles usable in atep (b) of the inventive method. Taking the signal indicated by ① for (≡Si-O)$_4$Si as the base, namely, a comparison is made between the signal ③ for (≡SiO)$_2$Si(OH) and the signal ② for (≡SiO)$_3$SiOH to indicate that the silica particles used in the inventive method have a small amount of the hydroxy groups while those used in the prior art method contain a large amount of hydroxy groups. The signals ⑥ and ⑦ are assigned to the ethoxy groups and the signal ⑧ is assigned to the methoxy groups.

Figure 2A:
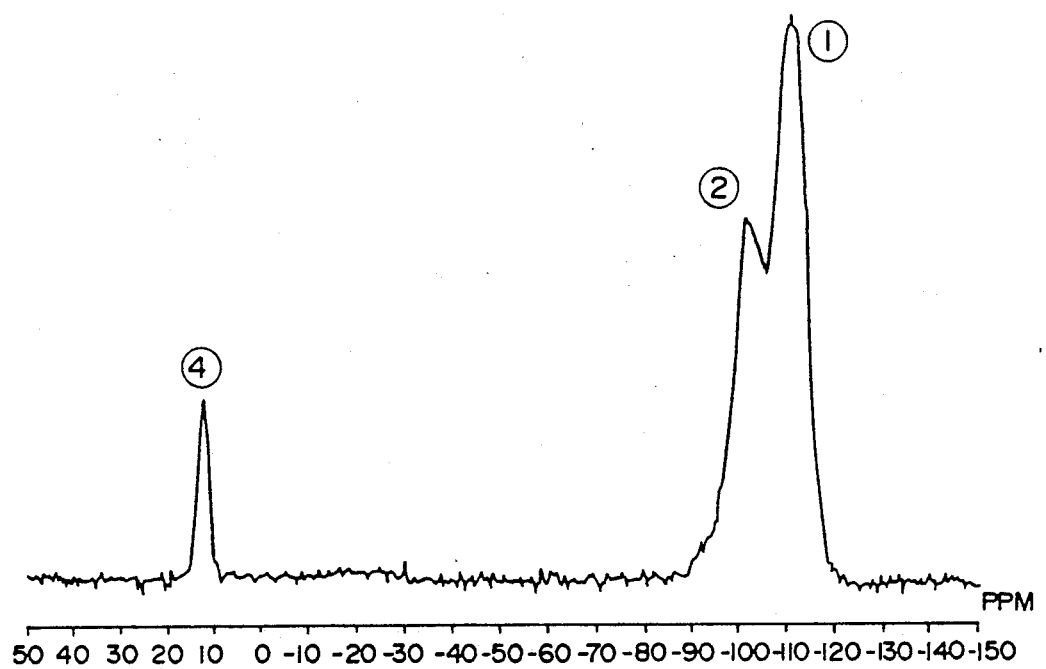
FIGS. 2a and 2b are each a diagram of the $^{29}$Si-NMR and $^{13}$C-NMR spectrum, respectively, of the surface-modified silica particles prepared in Example 1.
Figure 2B:
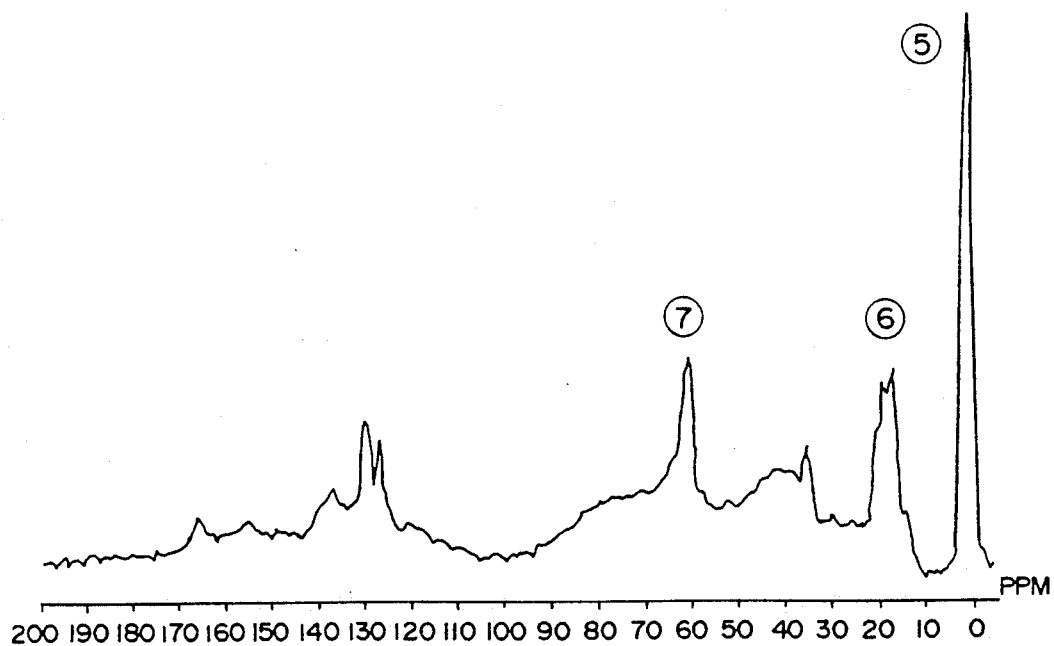

Further, a comparison of FIGS. 2a and 2b and FIGS. 4a and 4b provides a means for the evaluation of the surface-modified silica particles in the silica organosols prepared in Example 1 and Comparative Example 1. As is shown in FIG. 2a, the intensity of the signal ② due to the hydroxy groups is decreased as compared with FIG. 1a while the signals ④ and ⑤ due to the modifying trimethylsilyl groups appear in FIGS. 3a and 3b indicating that the silica surface has been actually modified. In contrast thereto, the intensity of the signal ② relative to the signal ① remains almost unchanged in FIG. 4a as compared with FIG. 3a and the signals ④ and ⑤ due to the trimethylsilyl groups appearing in FIGS. 4a and 4b are less intense than those in FIGS. 2a and 2b indicating less complete modification reaction than in FIGS. 2a and 2b.

EXAMPLES 2 TO 4 AND COMPARATIVE EXAMPLES 2 TO 4.

Table 1 summarizes the preparation conditions of the silica alcosol in each of these examples and comparative examples. Table 2 summarizes the conditions for the preparation of the silica organosol from the silica alcosol in each of these examples and comparative examples.

In Table 2, the surface modifying agents used are shown by the symbols I, II, III and IV, respectively, for:

hexamethyl disilazane;
trimethyl methoxy silane;
2-aminoethyl triethoxy silane; and
one-end silanol-terminated dimethyl polysiloxane of the formula  Me$_3$Si—O—(—SiMe$_2$—O—)$_{20}$—H, in which Me is a methyl group.

In Comparative Examples 2 and 3, silica organosols, of which the dispersion medium was almost free from the alcohol, could not be obtained due to the phase separation into silica particles and the organic medium taking place in the course of the distillation under reduced pressure when the content of xylene in the medium had reached 92% and 98% by weight, respectively, while the dispersion medium in the organosol obtained in each of Examples 2 to 4 contained at least 99.5% by weight of xylene.

TABLE 1

|  | Example | | | | Comparative Example | | |
|---|---|---|---|---|---|---|---|
|  | 1 | 2 | 3 | 4 | 1 | 2 | 3 |
| Silane hydrolyzed Si(OR)$_4$ | tetramethoxy silane | tetramethoxy silane | tetraethoxy silane | tetrabutoxy silane | tetramethoxy silane | tetramethoxy silane | tetrabutoxy silane |
| Alcohol as the hydrolysis medium | ethyl alcohol | meththyl alcohol | ethyl alcohol | butyl alcohol | ethyl alcohol | methyl alcohol | butyl alcohol |
| Reaction temperature, °C. | 38 | 40 | 20 | 20 | 40 | 20 | 20 |
| Concentration, moles/liter, in hydrolysis mixture | | | | | | | |
| Si(OR)$_4$ | 0.36 | 0.50 | 0.40 | 0.40 | 0.20 | 0.20 | 0.43 |
| H$_2$O | 1.9 | 1.9 | 2.0 | 2.0 | 11.0 | 16.1 | 21.2 |
| NH$_3$ | 0.44 | 0.1 | 1.0 | 1.2 | 1.0 | 7.0 | 9.4 |
| Concentration ratio, molar | | | | | | | |
| NH$_3$/Si(OR)$_4$ | 1.2 | 0.2 | 2.5 | 3.0 | 5.0 | 35.0 | 21.0 |
| H$_2$O/Si(OR)$_4$ | 5.9 | 3.6 | 5.0 | 5.0 | 55.0 | 81.0 | 50.0 |
| Silica particles | | | | | | | |
| Particle diameter, D, nm | 40 | 8 | 500 | 3000 | 15 | 350 | 2000 |
| Specific surface area, S, m$^2$/g | 250 | 650 | 210 | 120 | 300 | 10 | 2 |
| S × D | 10,000 | 5,200 | 105,000 | 360,000 | 4,500 | 3,500 | 4,000 |
| Density, μmoles/m$^2$, on the surface of silica particles | | | | | | | |
| RO groups | 2 | 8 | 6 | 5 | 2.5 | 1.8 | 2.0 |
| SiOH groups | 1.8 | 1.2 | 1.5 | 1.6 | 5.0 | 4.0 | 2.5 |

TABLE 2

|  | Example | | | | Comparative Example | | |
|---|---|---|---|---|---|---|---|
|  | 1 | 2 | 3 | 4 | 1 | 2 | 3 |
| Surface modifying agent | I | II | III | IV | I | II | III |
| Amount of surface modifying agent, % by weight of silica | 2.5 | 5.0 | 1.5 | 3.0 | 2.5 | 5.0 | 1.5 |
| Reaction temperature, °C. | 20 | 20 | 20 | 20 | 20 | 20 | 20 |
| Reaction time, hours | 3 | 3 | 2 | 6 | 5 | 6 | 6 |
| Concentration of silica in organosol obtained, % by weight | 25 | 38 | 30 | 20 | 10 | 15 | 15 |
| Concentration of xylene in dispersion medium, % by weight | >99.5 | >99.5 | >99.5 | >99.5 | 85 | 92 | 98 |

What is claimed is:

1. A method for the preparation of surface-modified silica particles dispersible in a hydrophobic organic solvent which comprises the steps of:

(a) hydrolyzing a tetraalkoxy silane compound in a medium of an alcohol containing from 2.5 to 6.0 moles of water and from 0.1 to 3 moles of an alkaline compound as a catalyst, each per mole of the tetraalkoxy silane compound, to form an alcosol of silica particles having alkoxy groups and hydroxy groups bonded to the silicon atoms on the surface; and (b) admixing the alcosol of silica particles with an organosilicon compound selected from the group consisting of the compounds represented by the general formula

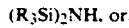

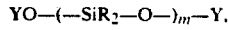

in which each R is, independently from the others, a hydrogen atom or an unsubstituted or substituted monovalent hydrocarbon group having 1 to 20 carbon atoms, X is a hydroxy group or an alkoxy group having 1 to 4 carbon atoms, Y is a hydrogen atom or an alkyl group having 1 to 4 carbon atoms, the subscript n is 1, 2 or 3 and the subscript m is a positive integer not exceeding 20, in an amount in the range from 0.01 to 10 moles per mole of SiO$_2$ in the silica particles under agitation of the mixture to effect a reaction for the modification of the surface of the silica particles.

2. The method for the preparation of surface-modified silica particles dispersible in a hydrophobic organic solvent as claimed in claim 1 wherein the silica particles in the alcosol have alkoxy groups and silanolic hydroxy groups bonded to the silicon atoms on the surface in densities of at least 3.5μ moles/m$^2$ and not exceeding 2μ moles/m$^2$, respectively, and the specific surface area S given in m$^2$/g and the average particle diameter D given in nm of the silica particles satisfy the relationship of S×D≧5000, D being 1 nm or larger.

3. The method for the preparation of surface-modified silica particles dispersible in a hydrophobic organic solvent as claimed in claim 1 wherein the concentration of the tetraalkoxy silane compound in the hydrolysis medium is in the range from 0.1 to 6.0 moles per liter.

4. The method for the preparation of surface-modified silica particles dispersible in a hydrophobic organic solvent as claimed in claim 1 wherein the alkaline compound as the catalyst is ammonia.

5. The method for the preparation of surface-modified silica particles dispersible in a hydrophobic organic solvent as claimed in claim 1 wherein the tetraalkoxy silane compound is selected from the group consisting of tetramethoxy silane, tetraethoxy silane, tetra(n-propoxy) silane, tetra(isopropoxy) silane, tetra(n-butoxy) silane and tetra(isobutoxy) silane.

6. The method for the preparation of surface-modified silica particles dispersible in a hydrophobic organic solvent as claimed in claim 1 wherein the alcohol as the hydrolysis medium is selected from the group consisting of methyl alcohol, ethyl alcohol, isopropyl alcohol and n-butyl alcohol.

7. The method for the preparation of surface-modified silica particles dispersible in a hydrophobic organic solvent as claimed in claim 1 wherein the hydrolysis medium in step (a) is kept at a temperature in the range from 10° C. to 50° C.

8. The method for the preparation of surface-modified silica particles dispersible in a hydrophobic organic solvent as claimed in claim 1 wherein the mixture in step (b) is agitated for at least one hour.

* * * * *